United States Patent [19]

Sano et al.

[11] 4,056,456

[45] Nov. 1, 1977

[54] PROCESS FOR PREPARING NOVEL THIN FILMS

[75] Inventors: Takezo Sano, Takatsuki; Masao Sasaki, Ibaragi, both of Japan

[73] Assignee: Sumitomo Chemical Company, Limited, Osaka, Japan

[21] Appl. No.: 526,253

[22] Filed: Nov. 22, 1974

[30] Foreign Application Priority Data

Nov. 22, 1973 Japan .................................. 48-131989

[51] Int. Cl.$^2$ .............................. B01K 1/00; B01J 1/00
[52] U.S. Cl. .................................. 204/165; 204/157.1 H; 204/158 HE; 427/36
[58] Field of Search ........................................ 204/165

[56] References Cited

U.S. PATENT DOCUMENTS

| | | | |
|---|---|---|---|
| 2,939,956 | 6/1960 | Parks | 250/49.5 |
| 3,309,299 | 3/1967 | Mantell | 204/165 |
| 3,334,037 | 8/1967 | Punderson | 204/165 |
| 3,387,991 | 6/1968 | Erchak | 204/165 X |
| 3,432,413 | 3/1969 | Vanderhoff | 204/159.22 |
| 3,475,307 | 10/1969 | Knox et al. | 204/168 |
| 3,485,734 | 12/1969 | Pecka | 204/165 |
| 3,526,583 | 9/1970 | Hayward | 204/165 |
| 3,674,667 | 7/1972 | Manion et al. | 204/165 |

*Primary Examiner*—F.C. Edmundson
*Attorney, Agent, or Firm*—Stevens, Davis, Miller & Mosher

[57] ABSTRACT

A thin film of less than 300 microns in thickness can be obtained by crosslinking a surfactant with plasma or radiation. This thin film is as high in strength as an ordinary plastic film, and is usable as a substance-separating film, a substance-protecting film or an insulating film.

14 Claims, No Drawings

PROCESS FOR PREPARING NOVEL THIN FILMS

This invention relates to a process for preparing a novel thin film by crosslinking a surfactant with plasma or radiation.

It has heretofore been known that a surfactant is adsorbed on the interface of gas-liquid, liquid-liquid or liquid-solid to form a monomolecular film, and that a built-up film is formed by accumulation of a large number of such monomolecular films. In the case of these films, however, the bonds between the molecules of the surfactant which have formed the film are dependent chiefly on the van der Waals force, so that the film is too low in mechanical strength to be taken out independently.

Paying attention to the fact that a surfactant can form a monomolecular film which is so thin as to be deemed extreme, the present inventors made various efforts with an aim to obtain an extremely thin film from a surfactant, taking advantage of the thin film-forming ability of the surfactant, and overcoming such drawback of the resulting film as being markedly low in mechanical strength. As a result, the inventors have surprisingly found that when exposed to plasma, a water-soluble surfactant gives a thin and tough film of less than 1 micron in thickness. The inventors have further found that the same result as above can be obtained even when the plasma is replaced by radiation such as electron beams or the like.

The film obtained according to the present invention has crosslinked the molecules of a surfactant and hence is so high in mechanical strength as not to be broken by its own weight and is well comparable in strength to an ordinary plastic film.

An object of the present invention is to provide a process for preparing a thin and tough film.

Other objects and advantages of the invention will become apparent from the explanation given below.

In accordance with the present invention, there is provided a process for preparing an extremely thin film insoluble in water or other solvents by crosslinking the surface or whole of a surfactant by irradiation with plasma or radiation.

Surfactants usable in the present invention include anionic surfactants such as fatty acid salts, sulfuric acid esters of higher alcohols, alkylbenzenesulfonates, alkylnaphthalenesulfonates, naphthalenesulfonic acid-formalin condensates, dialkyl sulfosuccinates, alkyl phosphates and polyoxyethylene sulfates; nonionic surfactants such as polyoxyethylene alkyl ethers, polyoxyethylene alkylphenol ethers, sorbitan fatty acid esters, polyoxyethylene fatty acid esters, hydroxyethylene sorbitan fatty acid esters, hydroxyethylene hydroxypropylene block polymers and fatty acid monoglycerides; cationic surfactants such as alkylamine salts, quaternary ammonium salts and polyoxyethylene alkylamines; amphoteric surfactants such alkyl betaines; and natural and flluorine surfactants. These surfactants are solid or liquid at room temperature (about 20° C.), but give excellent films regardless of whether they are solid or liquid.

Concrete examples of the surfactants are sodium oleate, potassium oleate, sodium lauryl sulfate, sodium laurylbenzene sulfonate, sodium polyoxyethylene alkyl sulfate, sodium polyoxyethylene alkylphenyl sulfate, polyoxyethylene lauryl ether, polyoxyethylene cetyl ether, polyoxyethylene stearyl ether, polyoxyethylene oleyl ether, polyoxyethylene octylphenol ether, polyoxyethylene nonylphenol ether, sorbitan monolaurate, sorbitan monostearate, sorbitan distearate, sorbitan monooleate, sorbitan sesquioleate, sorbitan trioleate, polyoxyethylene sorbitan monolaurate, polyoxyethylene sorbitan monostearate, polyoxyethylene sorbitan monooleate, polyethylene glycol monolaurate, polyethylene glycol monostearate, polyethylene glycol distearate, polyethylene glycol monooleate, laurylamine acetate, lauryl trimethylammonium chloride, polyoxyethylene alkylamine, lauryl betaine and saponin.

According to the process of the present invention, a film of less than 300 micron, even less than 1 micron, in thickness can be obtained with ease.

In the present invention, the plasma means such plasma as generated by glow discharge, corona discharge or the like procedure, and the radiation means electron beams, X-rays, $\gamma$-rays, $\alpha$-rays, neutron beams, ion beams or the like radioactive rays. According to glow discharge, for example, plasma is generated by charging a gas such as helium, argon nitrogebn, hydrogen, oxygen, carbon monoxide, carbon dioxide, ammonia, hydrocarbons having 1 to 10 carbon atoms such as, for example, methane, ethane, propane, ethylene, propylene, and acetylene; epoxides having 2 to 10 carbon atoms such as, for example, ethylene oxide, propylene oxide, and isobutylene oxide; alkylamines such as, for example, dimethylamine and triethylamine; or mixtures of these substances under a pressure of 0.01 to 10 Torr. into a vacuum container, and applying an alternating or direct current of 0.5 to 50 KV. from a high voltage electic source to electrodes in the vacuum container. Alternatively, plasma can be generated according to corona discharge at atmospheric pressure or in an inert gas atmosphere such as $N_2$, He or Ar, and, in this case, commercial scale production of thin film can be effected more easily. The thus generated plasma is greatly low in ability of penetrating into substance, so that even when applied to a surfactant which has been thickly coated on a support, the plasma crosslinks only the surface thereof to make it possible to obtain an extremely thin film by washing uncrosslinked portion of the surfactant with water or the like solvent.

The surfactant, which is to be irradiated according to the present invention with plasma or radiation, may be in optional form. In case the surfactant is solid, it is preferably used in the form of plate, tube, column, yarn, globe or the like complex form, or in the form of a composite with a support having the said form which may be porous or liquid. That is, the solid surfactant may be brought to the form of a composite with the above-mentioned support by applying a solution of the surfactant in water or other solent, or a melt formed by heating the surfactant to a temperature above the melting point thereof, to the support by coating or the like procedure. In case the surfactant is liquid, it is preferably brought to the form of a composite by applying the surfactant as it is to the above-mentioned support by coating or the like procedure. The surfactant in any of the above-mentioned form is crosslinked with radiation to form a thin film which, after removal of uncrosslinked portion, if any, with a proper solvent, is put into various uses.

Films prepared in the above manner may be used as, for example, films for separating or protecting substances, insulating films, coating films for improvement in properties of substrate surfaces, and the like.

A feature of the present invention lies in that since surfactants are used, thin films of various shapes can be formed with ease which are then crosslinked to obtain extremely thin and tough films.

Another feature of the invention lies in that plasma, which is employed as a means for crosslinking the surfactants used, is extremely low in ability of penetrating into substances, so that the surfactants irradiated with plasma are crosslinked only at the surfaces to give extremely thin films.

A further feature of the invention lies in that since surfactants are used, it is possible to obtain films having diverse properties such that the molecules forming the films have been oriented.

The films prepared according to the present invention are thin and tough, and hence are expected to be widely usable, utilizing the features thereof, as films for separating or protecting substances, insulating films, etc.

The present invention is illustrated in more detail below with reference to examples, but the invention is by no means limited to the examples.

EXAMPLE 1

Each of water-soluble surfactants Emulgen 220 (polyoxyethylene cetyl ether), Emulgen 430 (polyoxyethylene oleyl ether) and Emulgen 985 (polyoxyethylene nonylphenol ether) (each produced by Kao-Atlas Co.), which had been brought to molten state by heating to 100° C., was thinly coated on a glass plate and allowed to stand at room temperature, whereby the surfactant solidified to form a thin film. This film was crosslinked by exposing the same for 50 minutes to plasma generated during glow discharge conducted by applying a current of 6 KV. to electrodes in a nitrogen atmosphere under 0.2 Torr. Thereafter, the film was immersed, together with the glass plate, in water to obtain a water-insoluble thin film having a thickness of 1.2, 9 and 15 microns, respectively.

EXAMPLE 2

Each of tetrahydrofuran-soluble surfactants sorbitan monostearate and distearate, which had been brought to molten state by heating to 100° C., was allowed to form a thin film and crosslinked in the same manner as in Example 1, to obtain a tetrahydrofuran-insoluble film having a thickness of 0.9 micron.

EXAMPLE 3

A 1% aqueous solution of each of surfactants sodium lauryl sulfate, sodium laurylbenzene sulfonate, lauryl trimethylammonium chloride, Emulgen 220, Emulgen 430, Emulgen 985 and Emanorn 3199 (the latter four compounds being polyethylene cetyl ether, polyoxyethylene oleyl ether, polyethylene nonylphenyl ether and polyethylene glycol monostearate respectively; produced by Kao-Atlas Co.) was coated on a glass plate to form a thin film. After drying, the film was crosslinked under the same conditions as in Example 1 and then immersed, together with the glass plate, in water to obtain a water-insoluble thin film having a thickness of 0.5 to 1.2 micron.

EXAMPLE 4

Each of normally liquid flourine type surfactants Fluorad ®, FC 176 and FC 430 (each produced by Sumitomo-3M Co.) was thinly coated on a glass plate and then crosslinked under the same conditions as in Example 1 to obtain on the liquid surface a tough and thin film having a thickness of 1.0 micron.

EXAMPLE 5

A 1% aqueous solution of Emanorn 3199 was coated on a micro filter (VSWP, produced by Millipore Co.), and then air-dried at room temperature for 10 hours to prepare a composite. This composite was irradiated for 100 minutes with plasma generated during glow discharge conducted under conditions of a nitrogen gas pressure of 0.2 Torr. and a voltage of 6 KV., and then subjected to permeation test using a reverse Osmosis test cell, which was ordinarily employed in a laboratory, to find that the composite was usable as a film for separating substances, as is clear from the results shown below.

Test conditions:
 Pressure: 50 kg/cm$^2$
 Sodium chloride concentration of original liquid: 0.50%
Results:
 Flow rate of product water: 0.15 cc/cm$^2$.min
 Sodium chloride concentration of product water: 0.15%

What is claimed is:

1. A process for preparing a novel thin film which comprises crosslinking the surface of a layer of a surfactant selected from the group consisting of fatty acid salts, sulfuric acid esters of higher alcohols, alkylbenzenesulfonates, alkylnaphthalenesulfonates, naphthalenesulfonic acid-formalin condensates, dialkyl sulfosuccinates, alkyl phosphates, polyoxyethylene sulfates, alkylamine salts, quaternary ammonium salts, polyoxyethylene alkylamines, polyoxyethylene alkyl ethers, polyoxyethylene alkylphenol ethers, sorbitan fatty acid esters, polyoxyethylene fatty acid esters, hydroxyethylene sorbitan fatty acid esters, hydroxyethylenehydroxypropylene block polymers, fatty acid monoglycerides, and alkyl betaines, by irradiation with plasma, and then washing away the uncrosslinked portion of said surfactant with water or the like solvent to obtain an extremely thin film.

2. A process according to claim 1, wherein the surfactant is one member selected from the group consisting of sodium oleate, potassium oleate, sodium lauryl sulfate, sodium laurylbenzene sulfonte, sodium polyoxyethylene alkyl sulfate, sodium polyoxyethylene alkylphenyl sulfate, polyoxyethylene lauryl ether, polyoxyethylene cetyl ether, polyoxyethylene stearyl ether, polyoxyethylene oleyl ether, polyoxythylene octylphenol ether, polyoxyethylene nonylphenol ether, sorbitian monolaurate, sorbitan monostearat, sorbitan distearate, sorbitan monooleate, sorbitan sesquioleate, sorbitan trioleate, polyoxyethylene sorbitan monolaurate, polyoxyethylene sorbitan monostearate, polyoxyethylene sorbitan monooleate, polyethylene glycol monolaurate, polyethylene glycol monostearate, polyethylene glycol distearate, polyethylene glycol monooleate, laurylamine acetate, lauryl trimethylammonium chloride, polyoxylthylene alkylamine, lauryl betaine and saponin.

3. A process according to claim 1, wherein the thickness of the film is less than 300 microns.

4. A process according to claim 1, wherein the plasma is generated by glow discharge or corona discharge.

5. A process according to claim 4, wherein the glow discharge is effected in a gas under a pressure of 0.01 to 10 Torr. using an alternating or direct current of 0.5 to 50 KV.

6. A process according to claim 5, wherein the gas is helium, argon, nitrogen, hydrogen, oxygen carbon monoxide, carbon dioxide, ammonia, a hydrocarbon having 1 to 10 carbon atoms, an epoxide having 2 to 10 carbon atoms, an alkylamine, or mixture of these substances.

7. A process according to claim 6, wherein the hydrocarbon having 1 to 10 carbon atoms is methane, ethane, propane, ethylene, propylene or acetylene.

8. A process according to claim 6, wherein the epoxide having 2 to 10 carbon atoms is ethylene oxide, propylene oxide or isobutylene oxide.

9. A process according to claim 6, wherein the alkylamine is dimethylamine or triethylamine.

10. A process according to claim 5, wherein the corona discharge is effected at atmospheric pressure or in an inert gas atmosphere.

11. A process according to claim 10, wherein the inert gas is nitrogen, helium or argon.

12. A process according to claim 4, wherein the inert gas is nitrogen.

13. Thin films obtained according to the process of claim 1.

14. A process according to claim 1, wherein the plasma is generated by glow discharge in the presence of a nitrogen gas and the surfactant is a nonionic surfactant.

* * * * *